United States Patent
Jiao et al.

(10) Patent No.: US 11,130,190 B2
(45) Date of Patent: Sep. 28, 2021

(54) ELECTRO-SPARK DEPOSITION OF MOLYBDENUM ON STAINLESS STEEL AND PRODUCTS THEREOF

(71) Applicant: HUYS INDUSTRIES LIMITED, Weston (CA)

(72) Inventors: Zhen Jiao, Toronto (CA); Yunhong Zhou, Waterloo (CA)

(73) Assignee: HUYS INDUSTRIES LIMITED, Weston (CA)

( * ) Notice: Subject to any disclaimer, the term of this patent is extended or adjusted under 35 U.S.C. 154(b) by 247 days.

(21) Appl. No.: 16/329,117

(22) PCT Filed: Aug. 29, 2017

(86) PCT No.: PCT/CA2017/051013
§ 371 (c)(1),
(2) Date: Feb. 27, 2019

(87) PCT Pub. No.: WO2018/039785
PCT Pub. Date: Mar. 8, 2018

(65) Prior Publication Data
US 2019/0232412 A1 Aug. 1, 2019

Related U.S. Application Data

(60) Provisional application No. 62/381,958, filed on Aug. 31, 2016.

(51) Int. Cl.
*B32B 15/01* (2006.01)
*C23C 26/02* (2006.01)
(Continued)

(52) U.S. Cl.
CPC ............. *B23K 9/042* (2013.01); *B23K 9/04* (2013.01); *B23K 9/16* (2013.01); *B23K 35/0261* (2013.01);
(Continued)

(58) Field of Classification Search
CPC ...... B23K 2103/05; B23K 9/042; B23K 9/04; B23K 9/16; B23K 35/0261;
(Continued)

(56) References Cited

U.S. PATENT DOCUMENTS 3,868,277 A * 2/1975 Leroy ............... C23C 10/28
419/7
5,405,660 A * 4/1995 Psiuk ............... B23K 35/32
427/597

FOREIGN PATENT DOCUMENTS

DE 2402827 8/1974

OTHER PUBLICATIONS

Padgurskas et al., "Tribological properties of coatings obtained by electo-spark alloying C45 steel surfaces". Surface & Coatings Technology, 2017, vol. 311, pp. 90-97.
(Continued)

*Primary Examiner* — Michael E. La Villa
(74) *Attorney, Agent, or Firm* — Moore & Van Allen PLLC; Jeffrey R. Gray

(57) ABSTRACT

Molybdenum is alloyed into stainless steel surface by electro-spark deposition technique. Shielding gas is used during electro-spark deposition process to minimize the oxidation of materials. Control of electro-spark voltage, frequency, capacitance, time can determine the alloying depth of Molybdenum. The alloyed surface thickness varies from 5 µm to 80 µm depending on the electro-spark deposition parameters. The alloyed surface comprises, by weight, 15 to 40% of Molybdenum, 8 to 22% of Cr, 0-15% of other alloy elements and impurities. The molybdenum alloyed stainless steel surface exhibits improvement in micro-hardness, wear resistance, and especially corrosion resistance in sodium chloride solutions. Thus, the present invention would be utilized in marine and handling of brines application, as well
(Continued)

| Spectrum | Cr | Fe | Mo |
|---|---|---|---|
| 1 | 13.31 | 53.14 | 33.55 |
| 2 | 11.54 | 52.17 | 36.29 |
| 3 | 11.43 | 51.54 | 37.03 |
| 4 | 12.86 | 49.30 | 37.84 |
| 5 | 13.19 | 65.52 | 21.29 |
| 6 | 19.19 | 80.81 | |

*SEM and EDX results of a Molybdenum alloyed stainless steel surface* as in other applications which better corrosion resistance of stainless steel is desired.

17 Claims, 5 Drawing Sheets

(51) Int. Cl.
| | |
|---|---|
| C22C 38/22 | (2006.01) |
| B23K 9/04 | (2006.01) |
| B23K 9/16 | (2006.01) |
| B23K 35/32 | (2006.01) |
| B23K 35/02 | (2006.01) |
| B23K 35/30 | (2006.01) |
| C23C 28/02 | (2006.01) |
| C23C 30/00 | (2006.01) |
| B32B 15/18 | (2006.01) |
| B32B 15/04 | (2006.01) |
| C23C 26/00 | (2006.01) |
| B23K 103/04 | (2006.01) |

(52) U.S. Cl.
CPC .......... *B23K 35/3093* (2013.01); *B23K 35/32* (2013.01); *B32B 15/01* (2013.01); *B32B 15/013* (2013.01); *B32B 15/04* (2013.01); *B32B 15/043* (2013.01); *B32B 15/18* (2013.01); *C22C 38/22* (2013.01); *C23C 26/00* (2013.01); *C23C 26/02* (2013.01); *C23C 28/02* (2013.01); *C23C 28/021* (2013.01); *C23C 28/023* (2013.01); *C23C 30/00* (2013.01); *C23C 30/005* (2013.01); *B23K 2103/05* (2018.08); *C21D 2211/001* (2013.01); *C21D 2211/005* (2013.01); *Y10T 428/12826* (2015.01); *Y10T 428/12847* (2015.01); *Y10T 428/12854* (2015.01); *Y10T 428/12951* (2015.01); *Y10T 428/12958* (2015.01); *Y10T 428/12972* (2015.01); *Y10T 428/12979* (2015.01); *Y10T 428/12993* (2015.01); *Y10T 428/2495* (2015.01); *Y10T 428/24967* (2015.01); *Y10T 428/263* (2015.01); *Y10T 428/264* (2015.01); *Y10T 428/265* (2015.01)

(58) Field of Classification Search
CPC ............... B23K 35/3093; B23K 35/32; C21D 2211/001; C21D 2211/005; B32B 15/013; B32B 15/01; B32B 15/04; B32B 15/043; B32B 15/18; C22C 38/22; C23C 26/02; C23C 26/00; C23C 28/02; C23C 28/021; C23C 28/023; C23C 30/00; C23C 30/005; Y10T 428/12826; Y10T 428/12847; Y10T 428/12854; Y10T 428/12951; Y10T 428/12958; Y10T 428/12972; Y10T 428/12979; Y10T 428/12993; Y10T 428/2495; Y10T 428/24967; Y10T 428/263; Y10T 428/264; Y10T 428/265
See application file for complete search history.

(56) References Cited

OTHER PUBLICATIONS

Zhen Jiao, "Surface Modification of Stainless Steel by Electro-Spark Deposition". Master of Applied Science Thesis, Dec. 2016 (Dec. 2016), [online] [retrieved on Oct. 27, 2017 (Oct. 27, 2017)]. Retrieved from the Internet: https://uwspace.uwaterloo.ca/bitstream/handle/10012/11098/Jiao_Zhen.pdf?sequence=4.

Feng et al., "Tribological Behaviour of Molybdenum Alloying layer on H13 Steel by Electrospark Deposition Technique". Advanced Materials Research, 2010, vols. 97-101, pp. 1356-1359.

Bae et al., "Effect of Mo Contents on Corrosion Behaviours of Welded Duplex Stainless Steel". Met. Mater. Int., 2013, vol. 19(3), pp. 563-569.

Park et al., "Effect of Alloyed Mo and W on The Corrosion Characteristics of Super Duplex Stainless Steel Weld". Int. J. Electrochem. Sci., 2014, vol. 9, pp. 6687-6698.

Written Opinion and International Search Report issued in WIPO PCT/CA2017/051013 dated Nov. 30, 2017.

* cited by examiner

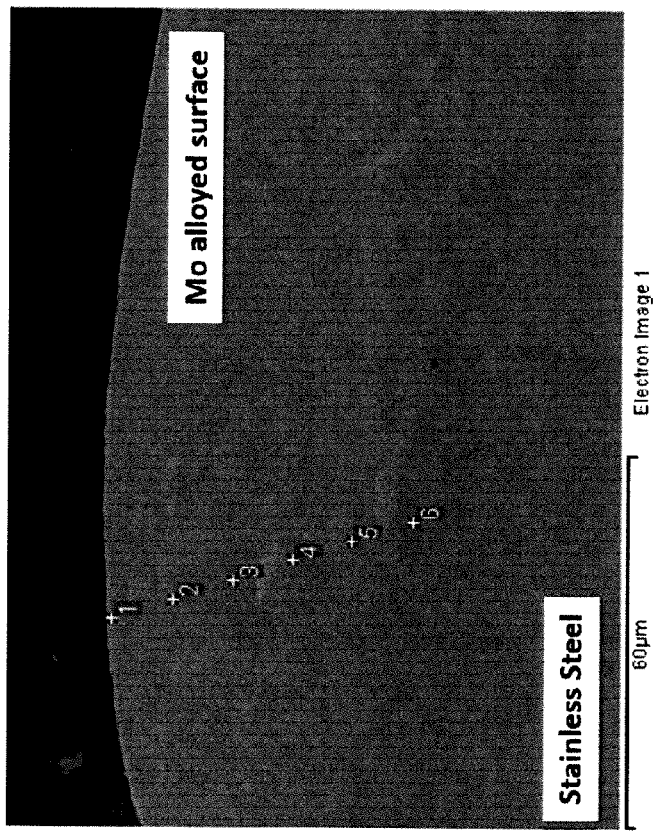
Figure 2 SEM and EDX results of a Molybdenum alloyed stainless steel surface
| Spectrum | Cr | Fe | Mo |
|---|---|---|---|
| 1 | 13.31 | 53.14 | 33.55 |
| 2 | 11.54 | 52.17 | 36.29 |
| 3 | 11.43 | 51.54 | 37.03 |
| 4 | 12.86 | 49.30 | 37.84 |
| 5 | 13.19 | 65.52 | 21.29 |
| 6 | 19.19 | 80.81 | |

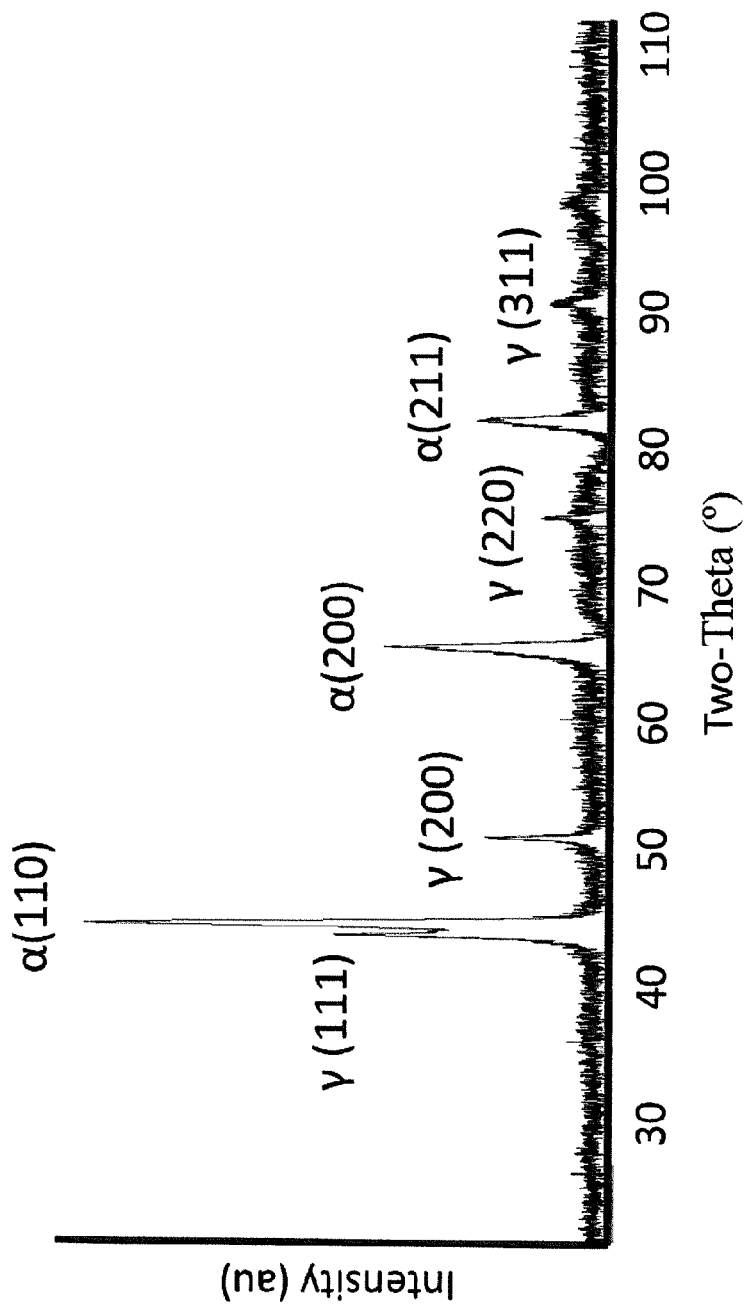
Figure 3 X-ray diffraction result of Molybdenum alloyed stainless steel surface

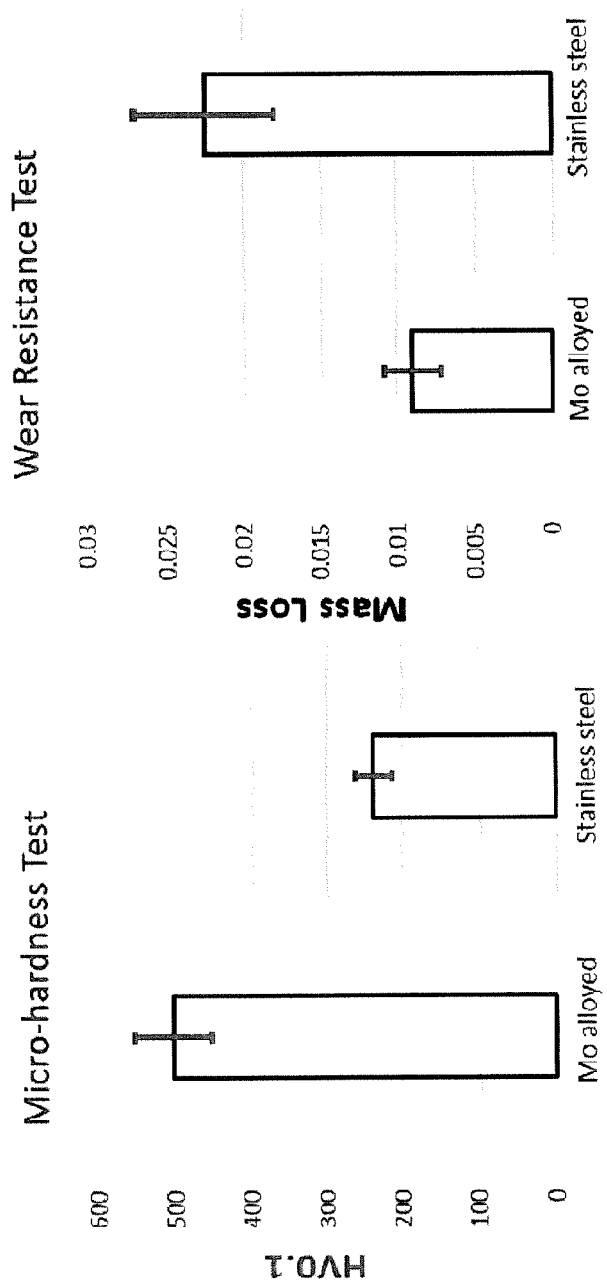
Figure 4 Micro-hardness and wear resistance test results of Molybdenum alloyed stainless steel

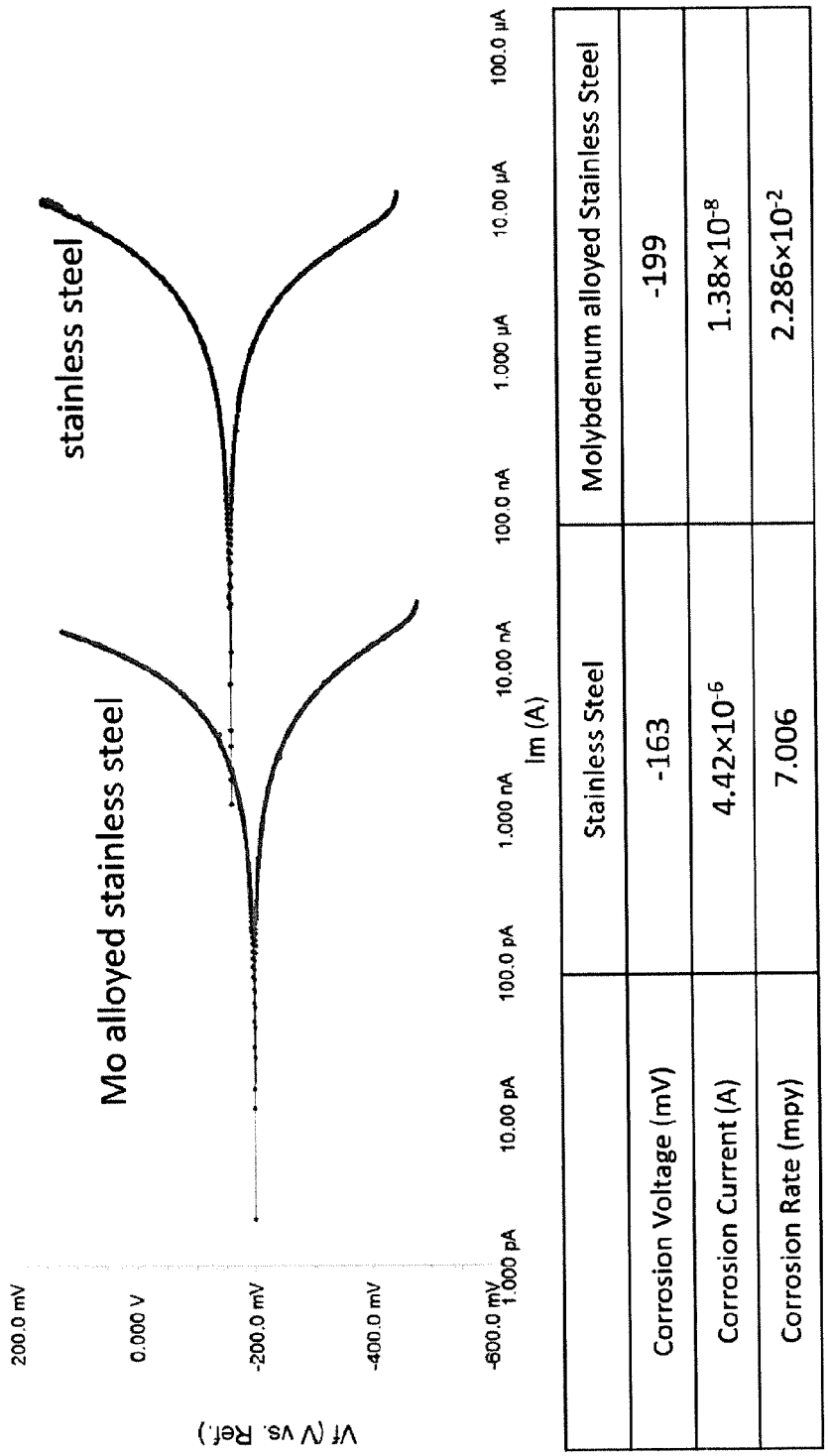
Figure 5 – Corrosion resistance test results of Molybdenum alloyed stainless steel ated Aug. 31, 2016, entitled "Metal Alloy and Process", the specification and drawings thereof being incorporated herein by reference.

ELECTRO-SPARK DEPOSITION OF MOLYBDENUM ON STAINLESS STEEL AND PRODUCTS THEREOF

CROSS REFERENCE TO RELATED APPLICATIONS

This application is a national stage application (filed under 35 § U.S.C. 371) of PCT/CA2017/051013, filed Aug. 29, 2017 of the same title, which, in turn, is based on, and claims the benefit of priority of, U.S. Provisional Patent Application 62/381,958 filed Aug. 31, 2016, entitled "Metal Alloy and Process", the specification and drawings thereof being incorporated herein by reference.

FIELD OF THE INVENTION

This invention relates to the field of metal alloys and metal alloying processes.

BACKGROUND OF THE INVENTION

It is sometimes desirable to metal bodies to have a corrosion resistant surface layer, or, more generally, a surface layer that has different chemical and mechanical properties, whether corrosion resistance, or hardness, or wear resistance, or tensile strength, from the underlying matrix. It may also be desirable to be able to apply such a layer even when, or perhaps particularly when, the underlying layer is not overly amenable to acceptance of a surface layer, and when it is desirable for the surface layer to adhere well under otherwise challenging conditions.

SUMMARY OF THE INVENTION

In an aspect of the invention there is a steel workpiece having a molybdenum-rich fused surface region formed on at least part of a surface thereof.

In a feature of that aspect of the invention the molybdenum-rich surface region is formed by Electro Spark Deposition. In another feature, the surface region is a surface layer in which molybdenum concentration exceeds 10%. In a further feature, the molybdenum-rich surface region is less than 100 µm thick. In a further feature, the molybdenum-rich surface region is at least 10 µm thick. In still another feature the molybdenum rich region is about 40 µm thick. In another feature, the molybdenum-rich surface region includes ferrite.

In another feature, the molybdenum rich surface region is a dual steel layer containing both austenite and ferrite. In a further feature, the ratio of austenite to ferrite is less than 60 austenite to 40 ferrite. In another feature, the ratio is about 40 austenite to 60 ferrite. In another feature, the ferrite is about 30% to 60% of the dual steel layer. In still another feature, the workpiece has a surface, and said molybdenum rich surface region forms only a portion of said surface.

In another feature the workpiece is a stainless steel workpiece. In another feature, the alloyed surface of said stainless steel workpiece comprises by weight, and one of (a) 15 to 40% of Molybdenum; and (b) 8 to 22% of Cr. In a further feature the workpiece comprises by weight, both of (a) and (b). In a further feature, after electro-spark alloying of molybdenum to the stainless steel surface, 30-60% of austenitic phase transforms to ferrite.

In another aspect of the invention there is a process of making the workpiece of any of the forgoing aspect and features wherein the workpiece has a surface and the process includes adding a molybdenum rich compound to at least a portion of said surface by Electro Spark Deposition.

In a feature of that aspect of the invention, the process has an initial ESD voltage in the range of 30 to 150 V. In another feature, the process occurs at an electrical frequency in the range of 120 to 550 Hz. In another feature, the penetration depth is in the range of 5-80 um. In a further feature, the process occurs in a shielded gas environment. In a still further feature, the shielding gas is Argon.

These and other aspects and features of the invention may be understood with reference to the detailed descriptions of the invention and the accompanying illustrations as set forth below.

BRIEF DESCRIPTION OF THE DRAWINGS

The accompanying figures are provided by way of illustration of an exemplary embodiment, or embodiments, incorporating principles and aspects of the present invention, and in which:

FIG. 2 shows a Scanning Electron Microscope (SEM) image and Energy Dispersive X-Ray (EDX) results of a Molybedenum Alloyed Stainless Steel Surface;

FIG. 3 shows an X-ray diffraction result of Molybdenum alloyed stainless steel surface;

FIG. 4 shows Micro-hardness and wear resistance test results of Molybdenum alloyed stainless steel; and FIG. 5 shows Corrosion resistance test results of Molybdenum alloyed stainless steel.

DETAILED DESCRIPTION OF THE INVENTION

Figure 1:
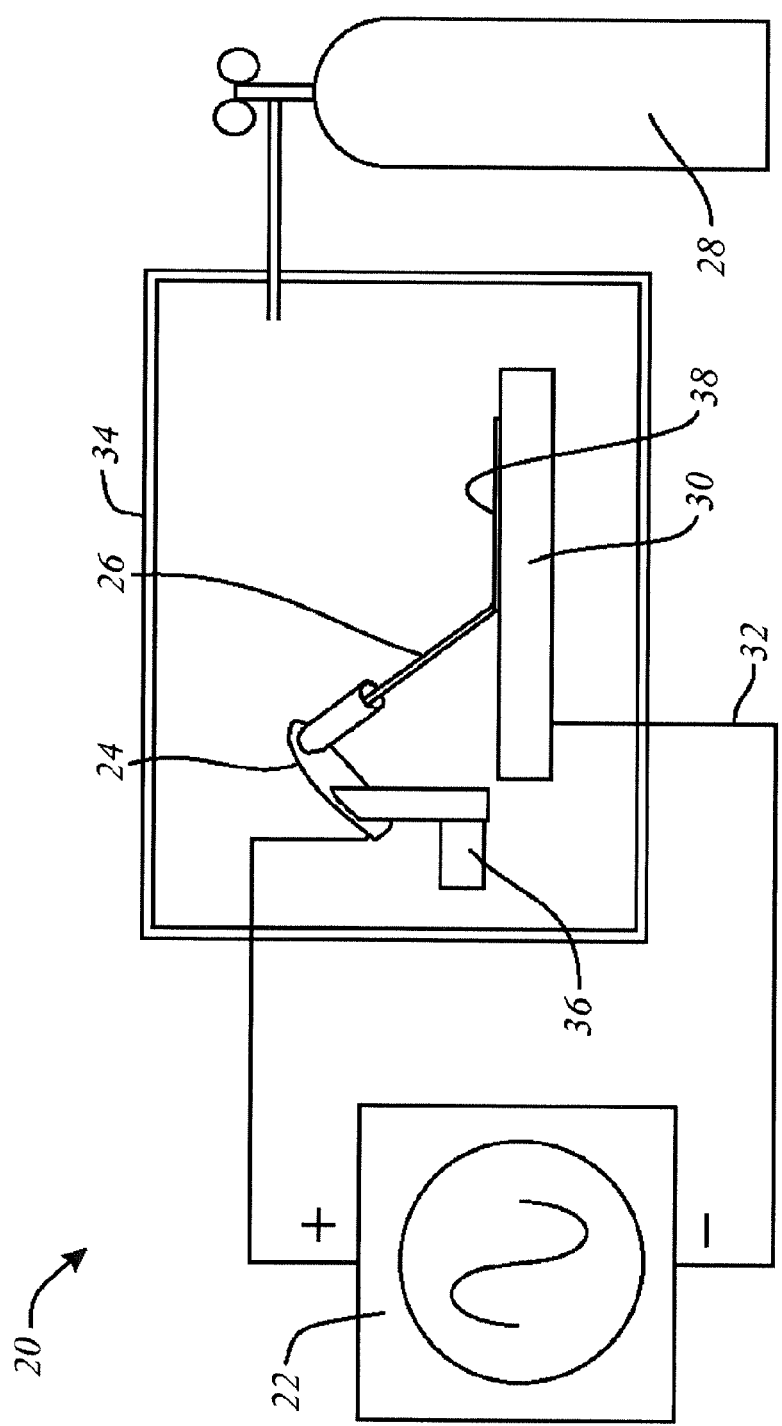
FIG. 1 shows a schematic general arrangement of an example of an ESD welding electrode apparatus.

The description that follows, and the embodiments described therein, are provided by way of illustration of an example, or examples, of particular embodiments of the principles of aspects of the present invention. These examples are provided for the purposes of explanation, and not of limitation, of those principles and of the invention. In the description, like parts are marked throughout the specification and the drawings with the same respective reference numerals. The drawings are not necessarily to scale and in some instances, proportions may have been exaggerated in order more clearly to depict certain features of the invention.

This specification discusses various metal alloys. Unless stated otherwise, compositions identified in this specification are indicated in percentages by weight.

In this description, a welding electrode may be of either the male type or the female type, as described below. In either case, the welding electrode may have the general form of a body of revolution formed about a central axis. This body of revolution may be considered in terms of a polar cylindrical co-ordinate system having a long axis, or axial direction, which may be termed the z-axis, a radial direction or radial axis r extending away from the z-axis, and a circumferential direction mutually perpendicular to the axial and radial directions, referenced from an angular datum.

This description mentions stainless steels. Due to its suitable mechanical properties, stainless steel is extensively used in marine applications, handling of brines, and in other applications in which enhanced corrosion resistance is desired. For the purposes of this discussion, the term "stainless steel" includes the grades of stainless steel recognized or defined by any SAE standard, and may include steels having between about 10% and about 30% Chromium by weight. Nickel is also often frequently used, and may be in the range of about 7% to about 25% by weight. A number of common stainless steel alloys have 18% Chromium and 8 to 14% Nickel.

Dual phase steels are steel alloys in which both austenite and ferrite phase of steel are present. The ferrite is dispersed within a matrix of austenite. Duplex stainless steels are a species of dual phase steels having a mixed microstructure of austenite and ferrite. Although the relative proportions of austenite and ferrite may vary, it may be that a mixture that is roughly half-and-half, i.e., at or close to 50% austenite and 50% ferrite. In commercial applications the proportion of austenite may be less than 50%. The ratio may, for example, be approximately 40% austenite to 60% ferrite. Dual phase steels may tend to give a higher tensile strength, and improved resistance to corrosion. Duplex steels may typically have high chromium content (19%-32%) and may have generally lower nickel contents than austenitic stainless steels.

Duplex stainless steel may have up to 6% of Molybdenum (Mo), and may have, or may yield, improved corrosion resistance. Such high corrosion resistance may be helpful in marine or handling of brines applications, as suggested by Park, H. J. and H. W. Lee, *Effect of Alloyed Mo and W on The Corrosion Characteristics of Super Duplex Stainless Steel Weld*. International Journal of Electrochemical Science, 2014. 9(12): p. 6687-6698 and by Bae, S. H. and H. W. Lee, *Effect of Mo contents on corrosion behaviors of welded duplex stainless steel*. Metals and Materials International, 2013. 19(3): p. 563-569. With increasing environmental awareness and more challenges of corrosion protection in marine applications, there is increasing demand for materials with extremely high corrosion resistance.

There are at least two types, or two methods, of improving corrosion resistance or wear resistance, or both, of such steels. The first approach is to modifying the composition and microstructure of steel. According to the formula of Pitting Resistance Equivalent Numbers (PREN), Mo content has a 3.3 factor that contributes to the corrosion resistance. As a result, Mo may be added to various stainless steel alloys to improve their corrosion resistance.

One such example is 316 stainless steel. Duplex stainless steel alloys have Mo content in the range of 2%-6% Mo. The molybdenum contributes to high corrosion resistance. Previous patent showed several kinds of steels containing a certain amount of chromium, nickel, silicon and molybdenum, which have good corrosion resistance. See, for example, U.S. Pat. No. 2,777,776 of Binder, issued June 1952; U.S. Pat. No. 3,649,225 of Ecer, issued May 1970; U.S. Pat. No. 3,904,401 of Mertz, issued Sep. 9, 1975; and U.S. Pat. No. 4,302,247 of Abe, issued Nov. 24, 1981. In these examples, the molybdenum is added to the metal, and is present throughout the body of the object.

Another approach is to apply a coating on the steel surface. Surface treatments are found in U.S. Pat. No. 3,884,705 of Blair, issued May 20, 1975; and in U.S. Pat. No. 3,962,501 of Ohbu et al., issued Jun. 8, 1976. In another example, in U.S. Pat. No. 3,979,351 of Sekhon, issued Sep. 7, 1973, there is a corrosion resistant coating that contains a mixture of a powdered metallic substance such as powdered aluminum or molybdenum disulfide.

U.S. Pat. No. 4,095,003 of Weatherly, issued Jun. 13, 1978 discloses duplex layers to provide thermal and corrosion resistance by plasma deposition. U.S. Pat. No. 4,325,994 of Kitashima, issued Apr. 20, 1982 describes a Ni and Co based coating, combined with Cr, Mo, Fe, Si B elements to provide high corrosion resistance. The coating can be applied on stainless steel surface by melting the coating materials. U.S. Pat. No. 4,453,976 issued Jun. 12, 1984 and U.S. Pat. No. 4,529,616 issued Jul. 16, 1985, both of Smythe, describe methods of applying a Nickel-based coating on metal surface by thermal spray to obtain better corrosion resistance. U.S. Pat. No. 5,273,712 of Czech, issued Dec. 28, 1993 disclosed a Ni or Co based super alloy coating, containing Rhenium to provide high corrosion and oxidation resistance. U.S. Pat. No. 5,292,382 of Longothermal describes a thermally sprayable molybdenum-iron alloy powder to provide higher wear and abrasion resistance. U.S. Pat. No. 5,451,470 of Ashmary, issued Sep. 19, 1995 describes a nickel-chromium coating to obtain high corrosion resistance and can be applied to metal surface by thermal spray.

Generally, metals corrode via electro-chemical reactions at the interface between the metal and an electrolyte solution. The first approach tends to produce a uniform, or very nearly uniform, relatively homogenous matrix material. Further, the composition of the material can be tuned during manufacturing. However, while the 'full-body' approach may yield good corrosion resistance at the surface, and, throughout the body of the material, by its nature the entire component has to include the alloying material. Materials such as molybdenum tend to be quite expensive, and, of necessity, to distribute the material in a finely dispersed manner by mixing it into molten solution necessitates the foundry facilities required to melt the constituents and so on. This may impose substantial costs.

In addition, as in any process of engineering optimization and compromise, other mechanical properties of the material may tend to be altered by the effect of adding greater quantities of the particular alloying elements introduced to obtain good corrosion resistance.

In the second approach, coating materials are applied to the metal surface, without changing the composition of the base metal. However, some coatings are not metallically bonded to the base metal or the coating adhesion is pretty week. That is, the interface between the coating and the base metal matrix may be distinct. In some instances it may be a mechanical bond, as opposed to a bond that occurs at the level of bonding of elements. Some coatings have to be melted at a high temperature, which may change the microstructure and properties of the base metal. That is, in some coating application processes the amount of heat applied may change the underlying grain structure, either by yielding a heat affected zone, or by causing sufficient heating to encourage precipitation of alloying elements within the main matrix, such as may tend to lessen their desired affects. Some methods, such as thermal or plasma sprays, may not be suitable for use in localised applications.

Electro-spark deposition (ESD) is a micro welding process that employs short duration electrical pulses to deposit electrode materials onto metallic substrates. ESD may typically be used to repair damaged high value precision products or to modify surfaces to increase wear and the corrosion resistance. ESD has wide applications in a broad range of aerospace, defense, automotive, and medical manufacturing activities. ESD may permit the formation of metallurgically-bonded coatings, or surface layers, yet may tend to do so with low and highly localised heat input to the workpiece. This metallurgically-bonded layer forming process is a fusion, or welding, process, as distinct from a mechancially bonded discrete surface layer such as may be produced with thermal spraying, such as a plasma spraying process, in which melted particles are blown at a cold, non-melted surface.

ESD may tend to occur while the workpiece is located in an ambient temperature environment, and, other than at the highly focused location of application it may occur while the body of the part being treated is at ambient temperature, or approximately ambient temperature. In this context, "approximately ambient" might be considered to be from −40 C to 250 C, where the upper end of "room temperature" is still many hundreds of Kelvins (if not more than a thousand Kelvins) below the melting point of the material matrix, and well below its softening temperature, and the temperatures at which alloying elements in the matrix generally may be inclined to precipitate of coalesce.

In these applications, ESD may tend not to change the composition or dispersion of alloying elements in the underlying matrix of the body of the object more generally, and, consequently, may tend not to change the bodily extensive properties of the substrate material.

The inventors have observed that where a thin coating has high Molybdenum content, it may provide high corrosion resistance without compromising the mechanical properties of base metals. Additionally, a molybdenum surface treatment may be applied without requiring that the entire body of the object include the surface treatment alloy, and yet may nonetheless enhance protection of the part from corrosion attack.

Further, an ESD coating may be applied to only particular portions of the surface of an object, and may be applied to components with complex shape. Moreover, the procedure may be carried out at ambient room temperature conditions, and may be carried out wherever it would also be possible to carry out a stick welding procedure. Modification of stainless steel surface by electro-spark deposition may open new opportunities for improving wear and corrosion resistance of stainless steel. It may expand the applications of stainless steel and reduce the cost for materials in marine and handling of brines applications.

The subject-matter herein relates to a process such as may tend to improve wear and corrosion resistance of stainless steel by alloying Molybdenum into the surface of stainless steel. Electro-spark deposition technique is employed to deposit Molybdenum on stainless steel surface. Shielding gas, such as Argon, is used during electro-spark deposition process to minimize the oxidation of materials. Control of electro-spark voltage, frequency, capacitance, time can determine the alloying depth of Molybdenum. The alloyed surface thickness varies from 5 μm to 80 μm depending on the electro-spark deposition parameters.

The composition of the alloyed surface of stainless steel comprising, by weight, 15 to 40% of Molybdenum, 8 to 22% of Cr, 0-15% of other alloy elements and impurities. The addition of molybdenum to the stainless steel surface introduces phase transformation, which improves the wear resistance and corrosion resistance. For example, 304 stainless steel has a fully austenitic structure. After electro-spark alloying of molybdenum to the stainless steel surface, 30 to 60% of austenitic phase transforms to ferrite phase. The addition of molybdenum to stainless steel surface, as well the phase transformation contributes to the improvement of wear and corrosion resistance.

The alloyed stainless steel surface exhibits near doubled micro-hardness than that of the original stainless steel. The wear resistance of the alloyed stainless steel is more than two times better than the base metal. More importantly, the alloyed stainless steel shows a huge improvement of corrosion resistance in NaCl solutions. For example, the corrosion rate of Mo alloyed 304 stainless steel in 5% NaCl was observed to be more than 300 times slower than base metal 304 stainless steel.

The present process provides a method to alloy molybdenum into stainless steel surface by electro-spark deposition. The higher molybdenum alloyed stainless steel at the surface may then tend to exhibit better wear resistance, and especially much better corrosion resistance in sodium chloride solutions. The invention would find wide applications in marine and handling of brines areas.

It has been known that the addition of Molybdenum can greatly improve corrosion resistance, especially against pitting and stress corrosion in chloride solutions. According to the formula of Pitting Resistance Equivalent Numbers (PREN), Mo content has a 3.3 factor that contributes to the corrosion resistance. However, as the content of Mo increases, formation of the vulnerable secondary phases may occur, which may decrease the mechanical properties of stainless steel.

In the schematic representation of FIG. 1, there is an electro-spark deposition apparatus or machine 20, which may include a power supply 22, and an applicator such as a welding electrode handle 24, to which a suitable electrode 26 is mounted. Electrode 26 is consumable, and has a composition corresponding to the desired surface layer composition. Electrode 26 may have an inert shielding gas supply, as notionally indicated at 28. A workpiece is indicated as 30. It is connected to the power supply (or to ground) by an electrical connection 32. In some embodiments, workpiece 30 may be placed in a work chamber 34 that is filled with inert gas, such as Argon, and the application is by a robot 36 also located within the chamber, operated by external control. In operation, the apparatus applies the electrode material to the surface of the workpiece, as notionally indicated at 38. The layer or coating that is laid down may be very thin, and its depiction in FIG. 1 is exaggerated for the purpose of conceptual illustration. During deposition, electrode 26 is kept in motion relative to workpiece 30, such that the energy input in any single location is limited and transitory.

In one example, workpiece 30 is a steel of metal material, and, in particular, a stainless steel material; and the process is one of depositing Mo, or a Mo composition, on to part, or all, of that stainless steel surface. Although workpiece 30 is shown for the purpose of conceptual understanding as having a flat surface, in general the shape and orientation of the workpiece surface need be neither flat nor horizontal. The electro-spark voltage, frequency, capacitance, and deposition time are variably controlled to permit operation yielding Mo alloyed surfaces with varying morphology and thickness, as may be appropriate. The operation window, or envelope of operating parameters, of the process of Molybdenum deposition on the stainless steel workpiece is evaluated by a series of experiments. The voltage is in the range of 50 to 150V electro-spark voltage. The deposition apparatus has a capacitance in the range of 10 to 300 μF capacitance. The frequency may be in the range of 120 to 550 Hz frequency is usable for deposition Mo onto stainless steel. The thickness of Mo alloyed area varies from 5-80 μm, depending on electro-spark parameters and deposition time. The deposition process is carried out under Ar shielding gas. Other shielding gases could also be used. In one example, using 110V voltage, 190 μF capacitance, 360 Hz frequency, 2 minutes' deposition, around 40 μm of the surface is alloyed with Mo.

Scanning electron microscope (SEM), and Energy-dispersive X-ray spectroscopy (EDX) are employed to investigate the microstructure and composition of the alloyed stainless steel surface. FIG. 2 shows one example of SEM and EDX results of Mo alloyed 304 stainless steel, which is made using the specific parameters mentioned above.

After electro-spark deposition of Mo onto stainless steel the inventors observed no major interfacial cracks, transverse cracks or large porosities in the alloying area. EDX results indicated that Mo content was relatively stable from the surface into the substrate, that content being close to 35%. In this case, the approximate alloying depth is around 40 μm. As may be noted, the Mo does not act as a distinct, or separate, or segregated coating on top of stainless steel. Instead, Mo is mixed with the stainless steel of the parent metal, and forms a true high-Mo-content alloy on the surface of the object. It is a welding process by which the metal composition of the welding rod and the immediate surface of the parent metal melt and fuse together. This feature tends to permit the corrosion resistant layer or region on the surface of the part to be established on parts that might not otherwise be amenable to welding or adhesion.

X-ray Diffraction (XRD) analysis is carried out to figure out the phase transformation after electro-spark alloying of molybdenum. XRD results of the previous sample is shown in FIG. 3. Base metal 304 stainless steel has a fully austenitic structure. According to the observed results, after electro-spark alloying of Molybdenum, phase transformation from austenite to ferrite occurred. This is because Molybdenum tends to be a ferrite former, which facilitates the phase transformation. The volume fraction of ferrite in the zone influenced by the process is near 60% after electro-spark alloying. The formation of ferrite may contribute to the improvement of wear and corrosion resistance.

The micro-hardness of the alloyed surface has been measured by Vickers hardness. The chart on the left hand side of FIG. 4 shows the comparison between Mo alloyed surface and unalloyed 304 stainless steel. The results show that the micro-hardness of Mo alloyed surface is more than twice as hard as that of 304 stainless steel. Further, the wear resistance of the sample was tested according to the ASTM G65 standard. The wear resistance was evaluated by comparing the weight loss after testing. The chart on the right hand side of FIG. 4 shows the wear resistance of Mo alloyed sample is less than half that of the base metal 304 stainless steel.

Corrosion resistance of the sample was investigated by electro-chemical analysis. Most metallic corrosion happens via electro-chemical reactions at the interface between the metal and an electrolyte solution. Corrosion usually occurs at a rate determined by an equilibrium between opposing electro-chemical reactions. One reaction is the anodic reaction, which involves metal oxidized, releasing electrons into the metal. The other is the cathodic reaction in which a solution species is reduced, removing electrons from the metal. The flow of electrons from each reaction is balanced when these two reactions are in equilibrium. FIG. 5 shows the corrosion resistance test results of Mo alloyed surface, as well as base metal 304 stainless steel in 5% NaCl solution. It is noted that the corrosion current of Mo alloyed sample is more than two magnitudes less than that of 304 stainless steel. As a result, the corrosion rate of Mo alloy sample is more than 300 times slower that base metal.

In summary, the inventors have observed that the process disclosed herein, which process includes electro-spark alloying of Molybdenum onto a stainless steel surface exhibits enhanced micro-hardness, wear resistance and corrosion resistance to chloride solution. The process and product produced by that process are thought to have many applications, including marine applications and handling of brines applications. The process may be applied at the time of manufacture, or it may be employed as a restorative of reparation procedure.

Various embodiments have been described in detail. Since changes in and or additions to the above-described best mode may be made without departing from the nature, spirit or scope of the invention, the invention is not to be limited to those details.

We claim:

1. A steel workpiece having a matrix and a surface region, said surface region being a molybdenum-rich fused surface region having a higher concentration of molybdenum by weight percent than does said matrix; said molybdenum-rich fused surface region being formed on at least part of a surface of said workpiece; said molybdenum-rich fused surface region is formed by Electro Spark Deposition; said molybdenum-rich surface region is a dual steel layer containing both an austenitic phase and a ferrite phase; said surface region is a surface layer in which molybdenum concentration exceeds 10%; and, after electro-spark alloying of molybdenum to the surface layer, 30 to 60% of the austenitic phase transforms to ferrite phase.

2. The steel workpiece of claim 1 wherein the molybdenum-rich surface region is less than 100 μm thick.

3. The steel workpiece of claim 1 wherein the molybdenum-rich surface region is more than 10 μm thick.

4. The steel workpiece of claim 1 wherein the molybdenum-rich region is about 40 μm thick.

5. The steel workpiece of claim 1 wherein said dual steel layer is made of a stainless steel having a ratio of austenite to ferrite of less than 60 austenite to 40 ferrite.

6. The steel workpiece of claim 5 wherein said ratio is about 40 austenite to 60 ferrite.

7. The steel workpiece of claim 1 wherein said ferrite phase is about 30% to 60% of said dual steel layer.

8. The steel workpiece of claim 1 wherein said molybdenum-rich surface region forms only a portion of said surface of said workpiece.

9. The steel workpiece of claim 1 wherein said workpiece is a stainless steel workpiece, and said surface region of said stainless steel workpiece is an alloy that comprises, by weight, at least one of (a) 15 to 40% of Molybdenum; and (b) 8 to 22% of Cr.

10. The steel workpiece of claim 9 wherein said workpiece comprises by weight, both of (a) and (b).

11. A process of making the workpiece of claim 1 wherein said process includes adding a compound that has a higher concentration of molybdenum than said workpiece to at least a portion of said surface by Electro Spark Deposition to form said molybdenum-rich surface region, and in which said process has an initial Electro Spark Deposition voltage in the range of 30 to 150 V.

12. The process of claim 11 wherein said process occurs at an electrical frequency in the range of 120 to 550 Hz.

13. The process of claim 11 wherein said process has a penetration depth of said molybdenum-rich surface region, and said penetration depth is in the range of 5-80 μm.

14. The process of claim 11 wherein said process occurs when said workpiece is in an ambient temperature environment.

15. The process of claim 11 wherein the process occurs in a shielding gas environment.

16. The process of claim 15 wherein the shielding gas is Argon.

17. The process of claim 11 wherein said process is applied only to a local portion of said workpiece, said workpiece is a stainless steel alloy having, by weight, (a) 15 to 40% of Molybdenum; and (b) 8 to 22% of Cr; said process occurs at an electrical frequency in the range of 120 to 550 Hz; said process has a penetration depth, and said penetration depth of said molybdenum-rich surface region is in the range of 5-80 µm; said process occurs when said workpiece is in an ambient temperature environment; and said Electro Spark Deposition occurs in the presence of a shielding gas.

\* \* \* \* \*